(12) United States Patent
Saito et al.

(10) Patent No.: US 9,117,595 B2
(45) Date of Patent: Aug. 25, 2015

(54) ELECTRONIC COMPONENT WITH TERMINAL STRIPS

(71) Applicant: TAIYO YUDEN CO., Ltd., Taito-ku, Tokyo (JP)

(72) Inventors: Naoki Saito, Takasaki (JP); Katsunosuke Haga, Takasaki (JP); Jae Hee Oh, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 133 days.

(21) Appl. No.: 14/014,114

(22) Filed: Aug. 29, 2013

(65) Prior Publication Data

US 2014/0063687 A1 Mar. 6, 2014

(30) Foreign Application Priority Data

Aug. 30, 2012 (JP) ................................. 2012-190106
Jul. 22, 2013 (JP) ................................. 2013-151646

(51) Int. Cl.
*H01G 4/228* (2006.01)
*H01G 4/30* (2006.01)
*H01G 4/232* (2006.01)

(52) U.S. Cl.
CPC ............... *H01G 4/228* (2013.01); *H01G 4/232* (2013.01); *H01G 4/30* (2013.01)

(58) Field of Classification Search
USPC ................ 361/308.1, 303–305, 301.2, 301.4, 361/306.1, 306.3, 311–313, 321.1, 321.2
See application file for complete search history.

(56) References Cited

U.S. PATENT DOCUMENTS

| 6,046,902 | A  | * | 4/2000 | Nakagawa et al. | ........ | 361/306.1 |
| 6,181,544 | B1 | * | 1/2001 | Nakagawa et al. | ........ | 361/321.1 |
| 6,433,992 | B2 | * | 8/2002 | Nakagawa et al. | ........ | 361/301.4 |
| 6,515,844 | B1 | * | 2/2003 | Moriwaki et al. | ......... | 361/306.1 |

(Continued)

FOREIGN PATENT DOCUMENTS

| CN | 101599365 A | 12/2009 |
| JP | H10303060 A | 11/1998 |
| JP | H11-251176 A | 9/1999 |

(Continued)

OTHER PUBLICATIONS

A Notice of Reasons for Refusal issued by Japanese Patent Office, mailed Aug. 4, 2014, for Japanese counterpart application No. 2013-151646.

(Continued)

*Primary Examiner* — Nguyen T Ha
(74) *Attorney, Agent, or Firm* — Law Office of Katsuhiro Arai (57) ABSTRACT

An electronic component with terminal strips joined to end faces of external electrodes via a solder is characterized in that two plate-like supports of each terminal strip are formed by bending two plate-like parts projecting outward in a line-symmetrical manner from both side edges of a plate-like leg in the width direction such that at least tips of the thickness surfaces on the electronic component sides of the two plate-like parts are positioned below an external electrode of the electronic component, and the electronic component is supported from below by the tips of the thickness surfaces on the electronic component sides of the four plate-like supports. Slipping of the electronic component from both terminal strips due to melting of the solder can be suppressed in a reliable manner.

7 Claims, 9 Drawing Sheets

(56) References Cited

U.S. PATENT DOCUMENTS

2009/0296311 A1    12/2009   Otsuka et al.
2012/0043854 A1    2/2012   Otsuka et al.

FOREIGN PATENT DOCUMENTS

JP     2004-273935 A    9/2004
JP     4338015 B2    9/2009

OTHER PUBLICATIONS

A Notification of Examination Opinions with Search Report issued by Taiwan Intellectual Property Office, mailed Aug. 26, 2014, for Taiwan counterpart application No. 102127991.

* cited by examiner

ELECTRONIC COMPONENT WITH TERMINAL STRIPS

FIELD OF THE INVENTION

The present invention relates to an electronic component with terminal strips comprising an electronic component having external electrodes on its opposing ends, as well as a terminal strip joined to each of the external electrodes, and constituted in such a way that both terminal strips are used to mount the electronic component onto a board or other mating part.

DESCRIPTION OF THE RELATED ART

With respect to the aforementioned electronic component with terminal strips, Patent Literature 1 specified below describes a capacitor with terminal strips comprising a multilayer ceramic capacitor (hereinafter simply referred to as "capacitor") having an external electrode on each of its opposing ends, as well as a terminal strip joined to each external electrode, wherein each terminal strip has a plate-like joint being joined via a solder (hereinafter referred to as "first solder") to the end face of each external electrode, a plate-like leg continuing from the plate-like joint, and a plate-like mounting part continuing from the plate-like leg. This capacitor with terminal strips is mounted onto a board or other mating part by joining the plate-like mounting parts of both terminal strips to a pad or other joining destination via a solder (hereinafter referred to as "second solder") of a composition identical to or different from the composition of the first solder.

The aforementioned capacitor with terminal strips can absorb, through the flexibility of the plate-like legs of both terminal strips, any external force that may generate based on the thermal expansion or contraction of the mating part, and therefore cracks and other damage that may otherwise occur as a result of transmission of such external force to the capacitor can be suppressed. In addition, even when voltage is applied to the mounted capacitor and the capacitor undergoes electrostriction, vibration caused by electrostriction can be absorbed by the flexibility of the plate-like legs of both terminal strips and therefore noise that may otherwise occur as a result of transmission of such vibration to the mating part can be suppressed.

With the aforementioned capacitor with terminal strips, using the reflow method to join the plate-like mounting parts of both terminal strips to a pad or other joining destination by the second solder may cause the first solder to melt during the reflow process, posing a risk of the capacitor slipping from both terminal strips.

One way to avoid the aforementioned risk is to use for the first solder a solder having a higher melting point than the second solder.

The first solder and second solder are generally lead-free solders that contain no lead in order to avoid negative effects on the natural environment, but types of lead-free solder suitable for practical use are limited. In other words, even when lead-free solders of different compositions are used for the first solder and second solder, the difference between the melting points of both is not very great and therefore avoiding the aforementioned risk by the aforementioned method is practically difficult.

On the other hand, another method to avoid the aforementioned risk is to provide, on both terminal strips, a part to prevent the capacitor from slipping even when the first solder melts during the reflow process. With respect to this method, Patent Literature 2 specified below describes a constitution where two shelf-like parts projecting toward the capacitor side are provided on each terminal strip, so that the capacitor is supported from below by a total of four shelf-like parts.

The shelf-like parts described in Patent Literature 2 specified below are formed by making L-shaped notches on both sides of the plate-like base material (referring to the terminal strip before being bent) and then bending the inner side of each notch to form an angle of 90 degrees with the capacitor-side surface of the plate-like base material. Because of this, it is difficult to support the capacitor from below with the four shelf-like parts unless the bending angle of each shelf-like part and restoration of its shape after bending are accurately controlled.

For example, if one of the four shelf-like parts is bent by an angle of more than 90 degrees or less than 90 degrees, and the first solder melts during the reflow process and the capacitor slips as a result, the capacitor may tilt due to the different bending angles and this tilting may cause the capacitor to slip more. In other words, it is structurally difficult to avoid the aforementioned risk using the shelf-like parts described in Patent Literature 2 specified below.

Incidentally, the aforementioned risk may also occur when the capacitor of the aforementioned capacitor with terminal strips is changed to a different type of electronic component.

Background Art Literatures

[Patent Literature 1] Japanese Patent Laid-open No. 2004-273935

[Patent Literature 2] Japanese Patent Laid-open No. Hei 11-251176

SUMMARY

An object of the present invention is to provide an electronic component with terminal strips wherein, while constituted in such a way that the plate-like joint of each terminal strip is joined to the end face of each external electrode via a solder, slipping of the electronic component from both terminal strips due to melting of the solder can be suppressed in a reliable manner.

To achieve the aforementioned object, the present invention provides an electronic component with terminal strips comprising an electronic component having external electrodes on its opposing ends, as well as a terminal strip joined to each of the external electrodes, and constituted in such a way that both terminal strips are used to mount the electronic component onto a board or other mating part, wherein: each of the terminal strips has a plate-like joint being joined via a solder to the end face of each of the external electrodes, a plate-like leg continuing from the plate-like joint, a plate-like mounting part continuing from the plate-like leg, and two plate-like supports continuing from the plate-like leg; the two plate-like supports are formed by bending two plate-like parts inward, which two plate-like parts project outward in a line-symmetrical manner from both side edges of the plate-like leg before bending, in such a way that at least the tip of a thickness surface on the electronic component side of each plate-like part is positioned below the electronic component; and the electronic component is supported from below by at least the tips of the thickness surfaces on the electronic component sides of the four plate-like supports. The "thickness surface" is a surface formed by thickness of the terminal strip or an edge face of the terminal strip, and at least the tip of the thickness surface of the plate-like part is in contact with the undersurface of the electronic component to support the electronic component.

According to the present invention, even when it is constituted in such a way that the plate-like joint of each terminal strip is joined to the end face of each external electrode via a solder, slipping of the electronic component from both terminal strips due to melting of the solder can be suppressed in a reliable manner.

The aforementioned and other objects of the present invention, and characteristics and effects according to each object, are made clear by the explanations below and drawings attached hereto.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

[FIG. 1]

[FIG. 2]

[FIG. 3]

[FIG. 4]

[FIG. 5]

[FIG. 6]

[FIG. 7] (A) in FIG. 7 is a longitudinal section view of key parts illustrating a layer structure of the material plate used to produce the terminal strip shown in FIG. 1; (B) in FIG. 7 is a longitudinal section view of key parts illustrating another layer structure of the material plate used to produce the terminal strip shown in FIG. 1; (C) in FIG. 7 is a longitudinal section view of key parts illustrating yet another layer structure of the material plate used to produce the terminal strip shown in FIG. 1; (D) in FIG. 7 is a longitudinal section view of key parts illustrating yet another layer structure of the material plate used to produce the terminal strip shown in FIG. 1; (E) in FIG. 7 is a longitudinal section view of key parts illustrating yet another layer structure of the material plate used to produce the terminal strip shown in FIG. 1; and (F) in FIG. 7 is a longitudinal section view of key parts illustrating yet another layer structure of the material plate used to produce the terminal strip shown in FIG. 1.

[FIG. 8] (A) in FIG. 8 is a supplemental explanation drawing that applies when the material plate shown in (C) in FIG. 7, (D) in FIG. 7, (E) in FIG. 7, or (F) in FIG. 7 is used, while (B) in FIG. 8 is a supplemental explanation drawing that applies when the material plate shown in (E) in FIG. 7 or (F) in FIG. 7 is used.

[FIG. 9] (A) in FIG. 9 is a supplemental explanation drawing that applies when the material plate shown in (A) in FIG. 7 is used; (B) in FIG. 9 is a supplemental explanation drawing that applies when the material plate shown in (B) in FIG. 7 is used; (C) in FIG. 9 is a supplemental explanation drawing that applies when the material plate shown in (C) in FIG. 7 is used; (D) in FIG. 9 is a supplemental explanation drawing that applies when the material plate shown in (D) in FIG. 7 is used; and (E) in FIG. 9 is a supplemental explanation drawing that applies when the material plate shown in (E) in FIG. 7 or (F) in FIG. 7 is used.

[FIG. 10]

[FIG. 11] (A) in FIG. 11 is a partial side view of an electronic component with terminal strips to which the present invention is applied (Second Embodiment), as viewed from the width direction thereof; while (B) in FIG. 11 is an interior view of the plate-like base material constituting the terminal strip shown in (A) in FIG. 11.

[FIG. 12] (A) in FIG. 12 is a partial side view of an electronic component with terminal strips to which the present invention is applied (Third Embodiment), as viewed from the width direction thereof; while (B) in FIG. 12 is an interior view of the plate-like base material constituting the terminal strip shown in (A) in FIG. 12.

[FIG. 13] (A) in FIG. 13 is a partial side view of an electronic component with terminal strips to which the present invention is applied (Fourth Embodiment), as viewed from the width direction thereof; while (B) in FIG. 13 is an interior view of the plate-like base material constituting the terminal strip shown in (A) in FIG. 13.

[FIG. 14] (A) in FIG. 14 is a partial side view of an electronic component with terminal strips to which the present invention is applied (Fifth Embodiment), as viewed from the width direction thereof; while (B) in FIG. 14 is an interior view of the plate-like base material constituting the terminal strip shown in (A) in FIG. 14.

[FIG. 15] (A) in FIG. 15 is a partial side view of an electronic component with terminal strips to which the present invention is applied (Sixth Embodiment), as viewed from the width direction thereof; while (B) in FIG. 15 is an interior view of the plate-like base material constituting the terminal strip shown in (A) in FIG. 15.

[FIG. 16] (A) in FIG. 16 is a partial side view of an electronic component with terminal strips to which the present invention is applied (Seventh Embodiment), as viewed from the width direction thereof; while (B) in FIG. 16 is an interior view of the plate-like base material constituting the terminal strip shown in (A) in FIG. 16.

[FIG. 17] (A) in FIG. 17 is a partial side view of an electronic component with terminal strips to which the present invention is applied (Eighth Embodiment), as viewed from the width direction thereof; while (B) in FIG. 17 is an interior view of the plate-like base material constituting the terminal strip shown in (A) in FIG. 17.

[FIG. 18] (A) in FIG. 18 is a partial side view of an electronic component with terminal strips to which the present invention is applied (Ninth Embodiment), as viewed from the width direction thereof; while (B) in FIG. 18 is an interior view of the plate-like base material constituting the terminal strip shown in (A) in FIG. 18.

DESCRIPTION OF THE SYMBOLS

10 - - - Capacitor, 11 - - - Main body, 12 - - - External electrode, 20, 20-1, 20-2, 20-3, 20-4, 20-5, 20-6, 20-7, 20-8 - - - Terminal strip, 21 - - - Plate-like joint, 22 - - - Plate-like leg, 23 - - - Plate-like mounting part, 24, 24-1, 24-2, 24-3, 24-4, 24-5, 24-6, 24-7, 24-8 - - - Plate-like support, 24a, 24a-1 - - - Tip, 30 - - - Solder, LY1 - - - Main metal layer, LY2, LY3 - - - Auxiliary metal layer, CL - - - Clearance.

DETAILED DESCRIPTION OF EMBODIMENTS

<<First Embodiment>>

An electronic component with terminal strips to which the present invention is applied (First Embodiment) is explained below by citing FIGS. 1 to 10.

The electronic component with terminal strips shown in FIGS. 1 to 4 has a multilayer ceramic capacitor (hereinafter simply referred to as "capacitor") 10 having an external electrode 12 on each of its ends in the length direction, as well as a terminal strip 20 joined to each external electrode 12 via a solder 30, where such electronic component is constituted in such a way that it is mounted onto a board or other mating part using both terminal strips 20.

Figure 1:
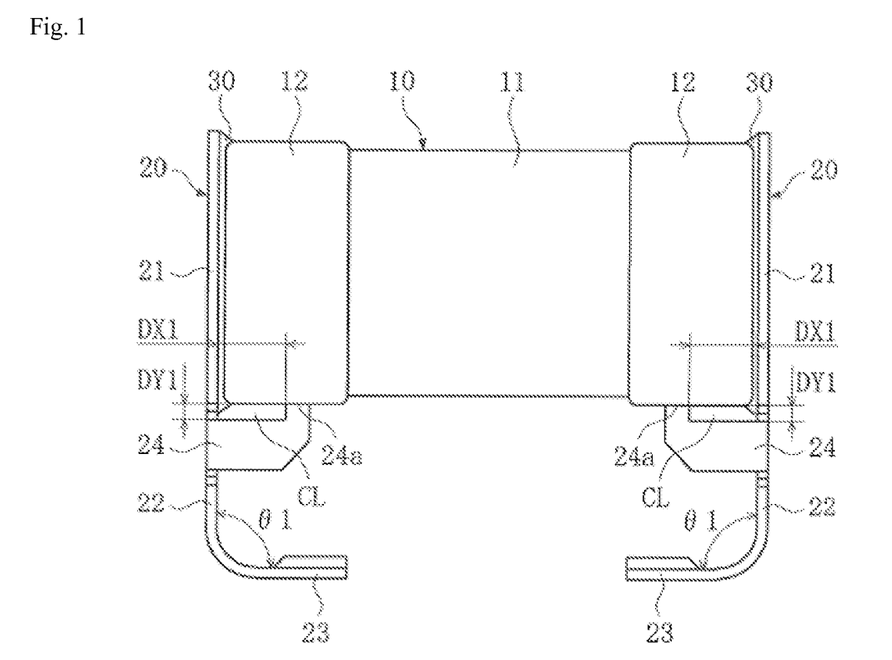
FIG. 1 is a side view of an electronic component with terminal strips to which the present invention is applied (First Embodiment), as viewed from the width direction thereof.
Figure 2:
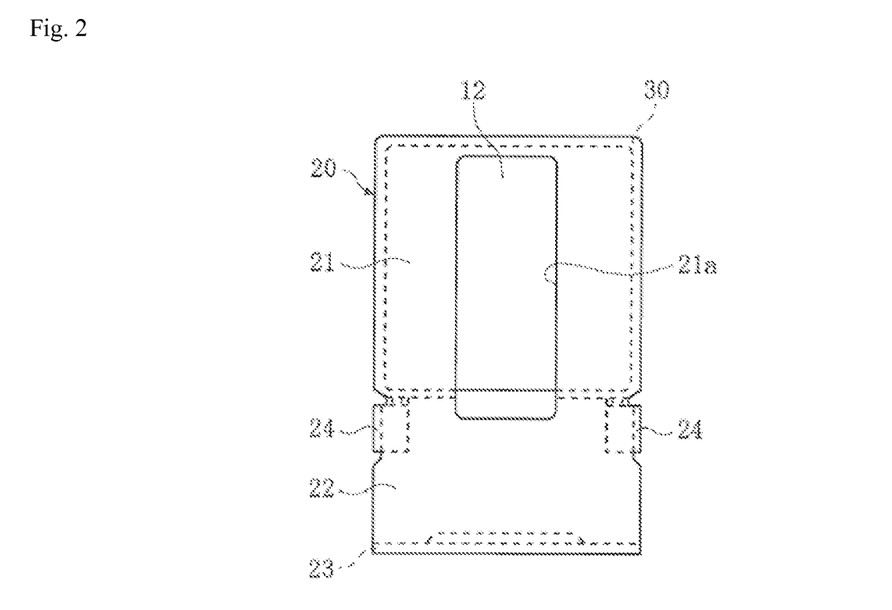
FIG. 2 is a side view of the electronic component with terminal strips shown in FIG. 1, as viewed from the length direction thereof.
Figure 3:
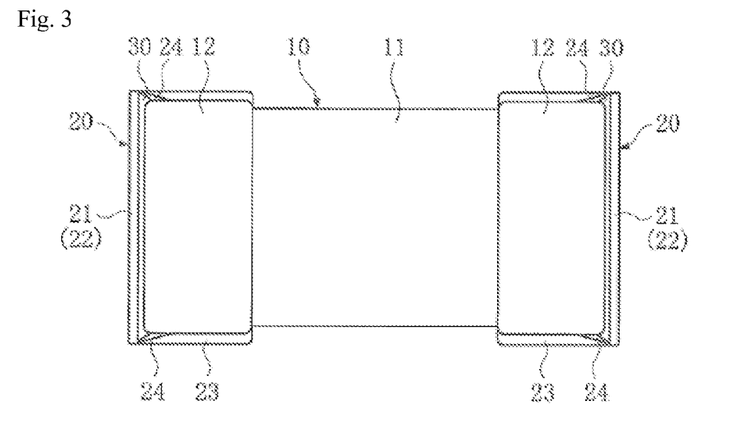
FIG. 3 is a top view of the electronic component with terminal strips shown in FIG. 1.
Figure 4:
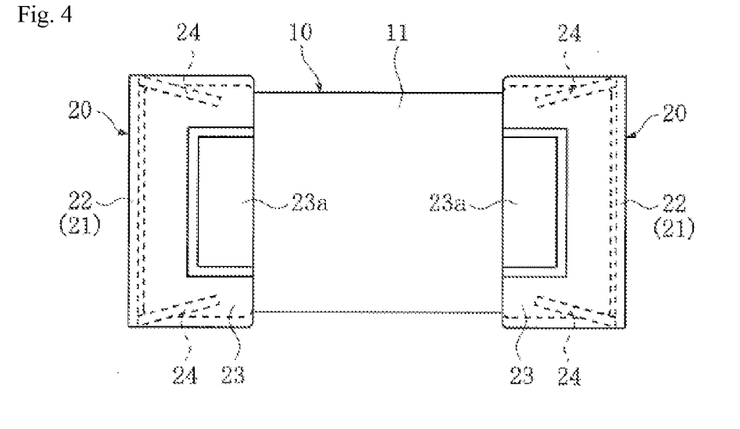
FIG. 4 is a bottom view of the electronic component with terminal strips shown in FIG. 1.

The capacitor 10 has a main body 11 having a roughly rectangular solid shape, and the external electrode 12 provided on each end of the main body 11 in the length direction, where the roughly rectangular solid as a whole has the dimensional relationships of "Length>Width=Height" or "Length>Width>Height." It should be noted that the length of the capacitor 10 represents the lateral dimension in FIG. 1, the width represents the proximal-distal dimension (dimension from the proximal side to the distal side on the paper) in FIG. 1, and the height represents the vertical dimension in FIG. 1.

Although not illustrated, the main body 11 of the component has a structure of many (such as 100 or more) internal electrode layers laminated in the height direction or width direction with dielectric layers in between. In one example of many internal electrode layers laminated in the height direction with dielectric layers in between, a margin constituted by the dielectric layer alone exists above the top internal electrode layer, below the bottom internal electrode layer, and on one side and the other side of each internal electrode layer in the width direction. Additionally, one edge in the length direction of the internal electrode layer in an odd-numbered position from the top is electrically connected to one external electrode 12 in FIG. 1, while one edge in the length direction of the internal electrode layer in an even-numbered position from the top is electrically connected to the other external electrode 12 in FIG. 1.

Each internal electrode layer is made of nickel, copper, palladium, platinum, silver, gold, or alloy thereof, etc., for example, where the thickness, composition, and shape (roughly rectangular) are roughly the same among the respective internal electrode layers. On the other hand, each dielectric layer including dielectric layer constituting a margin is made of barium titanate, strontium titanate, calcium titanate, magnesium titanate, calcium zirconate, calcium titanate zirconate, barium zirconate, titanium oxide, etc., for example, where the thickness, composition, and shape (roughly rectangular) are roughly the same among the respective dielectric layers. The shape of each dielectric layer is longer and wider than the shape of each internal electrode layer.

Each external electrode 12 partially covers the end faces of the main body 11 in the length direction and the four side faces adjoining the end faces. Although not illustrated, each external electrode 12 has a two-layer structure comprising a foundation film adhered to the exterior surface of the main body 11 and a surface film adhered to the exterior surface of the foundation film, or a multi-layer structure having at least one intermediate film between the foundation film and surface film. The foundation film is made of nickel, copper, palladium, platinum, silver, gold, or alloy thereof, etc., for example, the surface film is made of tin, palladium, gold, zinc, etc., for example, and the intermediate film is made of platinum, palladium, gold, copper, nickel, etc., for example.

Each terminal strip 20 has a plate-like joint 21 being joined via the solder 30 to the end face of each external electrode 12 in the length direction, a plate-like leg 22 continuing from the plate-like joint 21, a plate-like mounting part 23 continuing from the plate-like leg 22, and two plate-like supports 24 continuing from the plate-like leg 22.

The width and height of the plate-like joint 21 are slightly greater than the width and height of the end face of the external electrode 12 in the length direction, or roughly the same as the width and height of the end face of the external electrode 12 in the length direction. The width of the plate-like leg 22 is roughly the same as the width of the plate-like joint 21, and its interior surface and exterior surface are flush with the interior surface and exterior surface of the plate-like joint 21. The width of the plate-like mounting part 23 is roughly the same as the width of the plate-like leg 22, while the plate-like mounting part 23 is bent inward so as to form an angle of roughly 90 degrees (refer to the angle θ1 in FIG. 1) with respect to the plate-like leg 22. Also formed at the center of the plate-like joint 21 in the width direction is an oblong through hole 21a whose opening shape is roughly rectangular and which extends to the plate-like leg 22. Furthermore, a roughly rectangular concave 23a whose inner end and bottom surface are open is formed at the center in the width direction of the bottom end of the plate-like mounting part 23.

It should be noted that, while the interface between the plate-like mounting part 23 and plate-like leg 22 is rounded after bending in FIGS. 1 to 4, the interface between the plate-like mounting part 23 and plate-like leg 22 may also be angular after bending.

Figure 5:
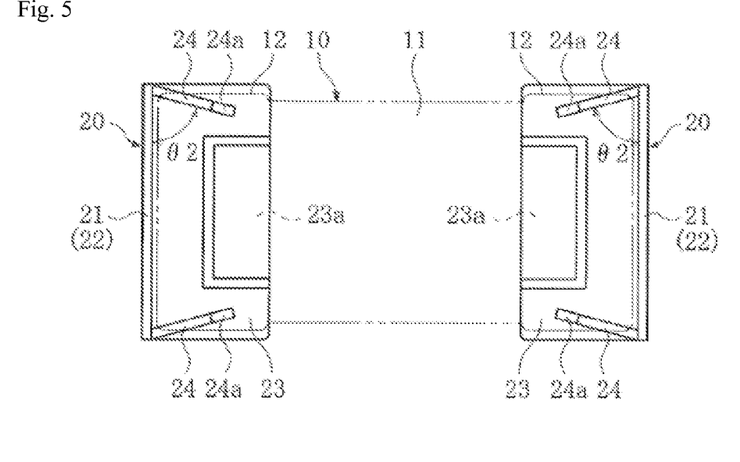
FIG. 5 is the same as FIG. 3, except that the electronic component and solder have been removed.

The two plate-like supports 24 are formed by bending two plate-like parts inward, which two plate-like parts project outward in a line-symmetrical manner from both side edges of the plate-like leg 22 in the width direction before bending (refer to FIG. 6), in such a way that at least tips 24a of the thickness surfaces on the capacitor 10 sides of the two plate-like parts are positioned below the external electrodes 12 of the capacitor 10 (refer to FIG. 5). In addition, the two plate-like supports 24 have roughly an L-shape as viewed from the side, where the tip 24a of the thickness surface on the capacitor 10 side of each plate-like support 24 is higher than other parts.

It should be noted that, while the bending angle of the plate-like support 24 is roughly 105 degrees in FIGS. 1 to 4, the bending angle may be smaller or greater than 105 degrees as long as the foregoing is satisfied. In other words, as long as the bending is appropriate in that the angle θ2 in FIG. 5 becomes an acute angle, at least the tip 24a of the thickness surface on the capacitor 10 side of each plate-like support 24 will be positioned below the external electrode 12 of the capacitor 10.

In essence, the capacitor 10 is supported from below by the tips 24a of the thickness surfaces on the capacitor 10 sides of the four plate-like supports 24. Since each tip 24a has a roughly rectangular shape with area, each tip 24a is contacting the bottom surface of the external electrode 12 of the capacitor 10 in a state of surface contact (referring to either a state of complete surface contact or incomplete surface contact). Also, because the four plate-like supports 24 each have roughly an L-shape as viewed from the side, a clearance CL determined by the vertical dimension DY1 and lateral dimension DX1 exists between the thickness surface, except for the tip 24a, on the capacitor 10 side of each of the four plate-like supports 24 and the bottom surface of the external electrode 12 of the capacitor 10 (refer to FIG. 1).

Figure 6:
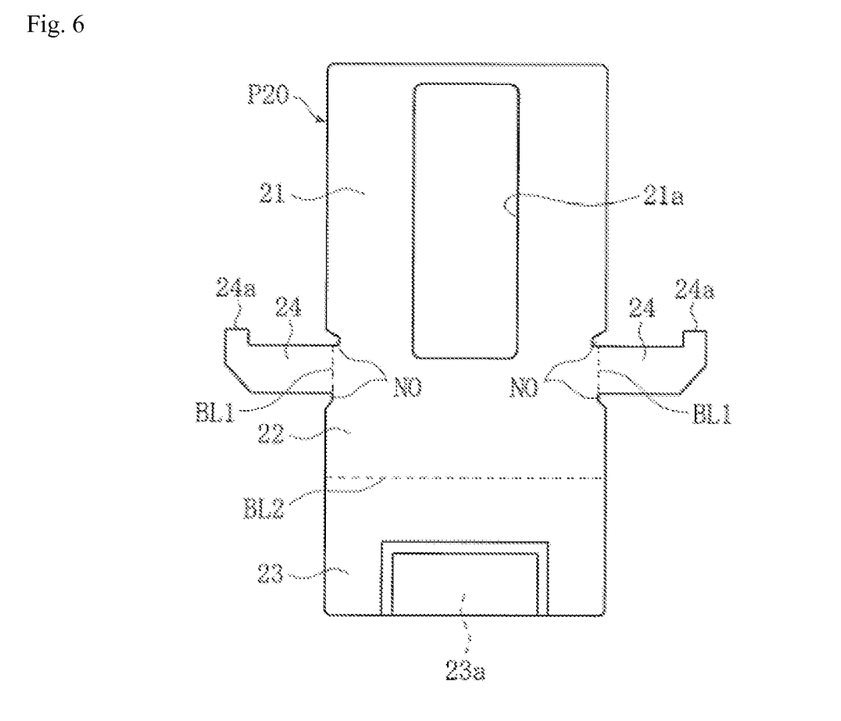
FIG. 6 is an interior view of the plate-like base material constituting the terminal strip shown in FIG. 1.
Figure 7:
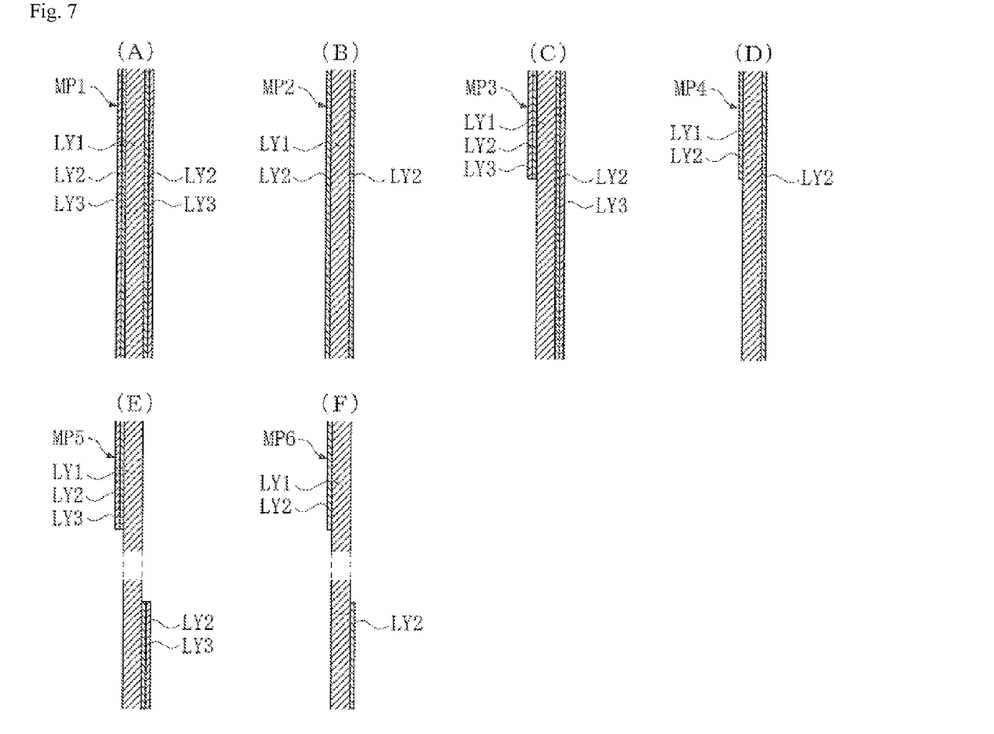

Here, a favorable production method of the terminal strip 20 is explained by citing FIGS. 6 to 9 as deemed appropriate. A material plate MP1 shown in (A) in FIG. 7 is prepared prior to the production process. This material plate MP1 has, in its thickness direction, a main metal layer LY1 of low solder 30 wettability, first auxiliary metal layer LY2 of high solder 30 wettability covering both sides of the main metal layer LY1, and second auxiliary metal layer LY3 of high solder 30 wettability covering the surface of the first auxiliary metal layer LY2. The main metal layer LY1 is made of stainless steel, iron, copper, or alloy thereof, etc., for example, while the first auxiliary metal layer LY2 and second auxiliary metal layer LY3 are made of nickel, tin, etc., for example. Also, the thickness of the material plate MP1 is within a range where the specified flexibility can be ensured, or preferably in a range of 0.05 to 0.2 mm.

Next, a plate-like base material P20 shown in FIG. 6 is produced from the material plate MP1 by means of pressing, laser processing, etc. As is evident from FIG. 6, the two plate-like parts that will become the plate-like supports 24 are projecting outward in a line-symmetrical manner from both side edges in the width direction of the plate-like part that will become the plate-like leg 22. On the plate-like base material P20, a notch NO is formed at the base end of the plate-like part that will become each plate-like support 24 so that, when the plate-like part that will become each plate-like support 24 is bent, the bent end of each plate-like support 24 will not project from either edge of the plate-like leg 22 in the width direction.

Figure 9:
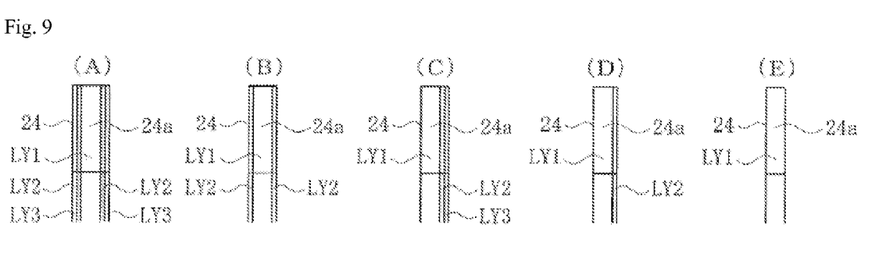

Next, the two plate-like parts of the plate-like base material P20 that will become the plate-like supports 24 are each bent to the proximal side in FIG. 6 along a bending line BL1 (running in parallel with both side edges of the plate-like part that will become the plate-like leg 22), while at the same time the plate-like part that will become the plate-like mounting part 23 is bent to the proximal side in FIG. 6 along a bending line BL2 (running in parallel with the bottom edge of the plate-like part that will become the plate-like mounting part 23). The respective bending angles are as mentioned above. Since the material plate MP1 is constituted by five layers (refer to (A) in FIG. 7), the main metal layer LY1, two first auxiliary metal layers LY2, and two second auxiliary metal layers LY3 are exposed on the thickness surfaces on the capacitor 10 sides of the two plate-like supports 24 formed by bending, as shown in (A) in FIG. 9.

(B) in FIG. 7, (C) in FIG. 7, (D) in FIG. 7, (E) in FIG. 7 and (F) in FIG. 7 show the layer constitutions of material plates MP2, MP3, MP4, MP5, and MP6 that can be used in place for the material plate MP1 shown in (A) in FIG. 7.

The material plate MP2 shown in (B) in FIG. 7 has a layer constitution different from that of the material plate MP1 shown in (A) in FIG. 7 in that there are no two second auxiliary metal layers LY3. If this material plate MP2 is adopted, the main metal layer LY1 and two first auxiliary metal layers LY2 are exposed on the thickness surfaces on the capacitor 10 sides of the two plate-like supports 24 formed by bending, as shown in (B) in FIG. 9.

Figure 8:
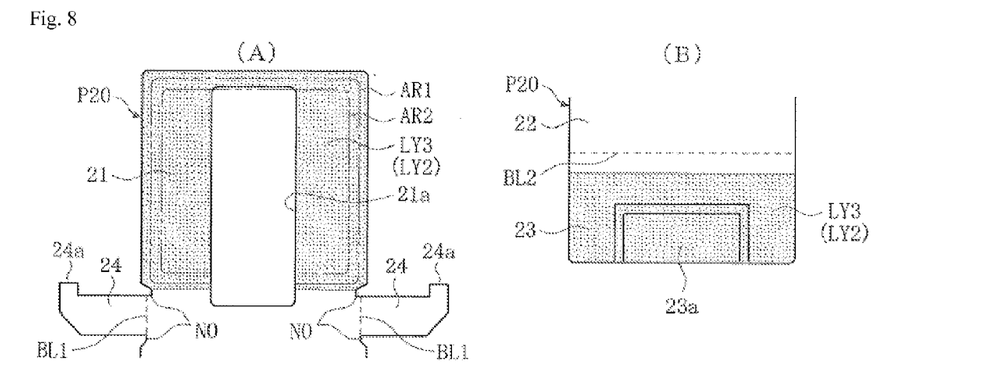

The material plate MP3 shown in (C) in FIG. 7 and material plate MP4 shown in (D) in FIG. 7 have the first auxiliary metal layer LY2 and second auxiliary metal layer LY3, or only the first auxiliary metal layer LY2, provided partially on the side (left side in each figure) that will become the interior surface of the terminal strip 20, or specifically on only the interior surface of the part that will become the plate-like joint 21 (refer to (A) in FIG. 8). The first auxiliary metal layer LY2 and second auxiliary metal layer LY3, or only the first auxiliary metal layer LY2, are/is provided over the entire side (right side in each figure) that will become the exterior surface of the terminal strip 20. If this material plate MP3 or MP4 is adopted, the main metal layer LY1, one first auxiliary metal layer LY2, and one second auxiliary metal layer LY3, or the main metal layer LY1 and one first auxiliary metal layer LY2, are exposed on the thickness surfaces on the capacitor 10 sides of the two plate-like supports 24, as shown in (C) in FIG. 9 and (C) in FIG. 9, because there is no first auxiliary metal layer LY2 or second auxiliary metal layer LY3 on the inner sides of the two plate-like supports 24 formed by bending.

The material plate MP5 shown in (E) in FIG. 7 and material plate MP6 shown in (F) in FIG. 7 have the first auxiliary metal layer LY2 and second auxiliary metal layer LY3, or only the first auxiliary metal layer LY2, provided partially on the side (left side in each figure) that will become the interior surface of the terminal strip 20, or specifically on only the interior surface of the part that will become the plate-like joint 21 (refer to (A) in FIG. 8). Also, the first auxiliary metal layer LY2 and second auxiliary metal layer LY3, or only the first auxiliary metal layer LY2, are/is provided partially on the side (right side in each figure) that will become the exterior surface of the terminal strip 20, or specifically on only the exterior surface of the part that will become the plate-like mounting part 23 (refer to (B) in FIG. 8). If this material plate MP5 or MP6 is adopted, only the main metal layer LY1 is exposed on the thickness surfaces on the capacitor 10 sides of the two plate-like supports 24, as shown in (E) in FIG. 9, because there is no first auxiliary metal layer LY2 or second auxiliary metal layer LY3 on the inner sides or outer sides of the two plate-like supports 24 formed by bending.

It should be noted that, when any of (C) in FIG. 7 to (F) in FIG. 7 is adopted, the area defined by the first auxiliary metal layer LY2 and second auxiliary metal layer LY3, or first auxiliary metal layer LY2, present on the interior surface of the plate-like joint 21, may cover the entire interior surface of the plate-like joint 21, or area AR1 roughly equivalent to the area of the end face of the external electrode 12 in the length direction, or area AR2 slightly smaller than the area of the end face of the external electrode 12 in the length direction, as shown in (A) in FIG. 8.

To produce the electronic component with terminal strips shown in FIGS. 1 to 4, first a capacitor 10 and two terminal strips 20 produced as above are prepared. Next, the two terminal strips 20 are positioned roughly in parallel and facing each other in such a way that a space slightly larger than the length of the capacitor 10 is left between the interior surfaces of each plate-like joint 21 and each plate-like leg 22 and that each plate-like mounting point 23 faces the inside. Next, a capacitor 10 is inserted between the two plate-like joints 21 in such a way that the end face of each external electrode 12 in the length direction faces the interior surface of each plate-like joint 21, after which the bottom surface of one external electrode 12 is placed over the tips 24a of the two plate-like supports 24 of one terminal strip 20, while the bottom surface of the other external electrode 12 is placed over the tips 24a of the two plate-like supports 24 of the other terminal strip 20. Next, the end face in the length direction of each external electrode 12 of the capacitor 10 is joined to the interior surface of each plate-like joint 21 via the solder 30. Here, the solder 30 is made of tin-antimony, tin-silver-copper, etc., for example.

Figure 10:
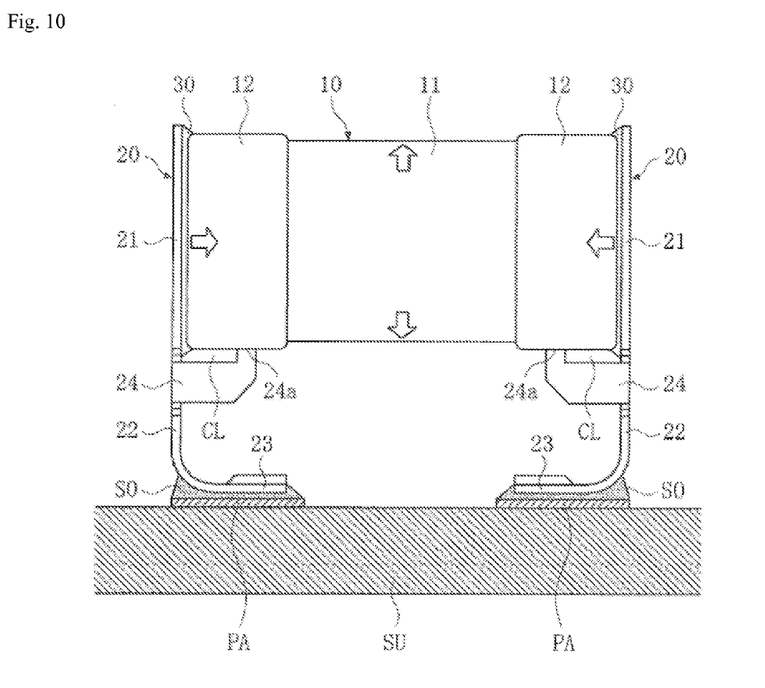
FIG. 10 is a side view of a condition where the electronic component with terminal strips shown in FIG. 1 is mounted onto a board, as viewed from the width direction.

To mount the electronic component with terminal strips shown in FIGS. 1 to 4 onto a board or other mating part using the reflow method, or specifically onto a board, for example, a cream solder made of tin-antimony, tin-silver-copper, tin-zinc, etc., for example, or preferably a cream solder whose melting point is lower than that of the solder 30, is applied on each pad PA of the board SU and then the bottom surface of the plate-like mounting part 23 of each terminal strip 20 is pressed against the applied cream solder to place the electronic component with terminal strips, as shown in FIG. 10. Next, the board SU on which the electronic component with terminal strips has been placed is put in a reflow furnace to melt the cream solder, after which the molten solder is cured and the plate-like mounting part 23 of each terminal strip 20 is joined to each pad PA via the solder SO. It should be noted that the concave 23a present on the bottom surface of each plate-like mounting part 23 serves to collect excess solder SO when the bottom surface of each plate-like mounting part 23 is joined to the pad PA, and also to receive air bubbles in the solder SO.

In the mounted state shown in FIG. 10, any external force that may generate based on thermal expansion or contraction of the board SU can be absorbed by the flexibility of the plate-like legs 21 of both terminal strips 20 and therefore cracks and other damage that may otherwise occur as a result of transmission of such external force to the capacitor 10 can be suppressed. In addition, even when voltage is applied to the capacitor 10 and it undergoes electrostriction (refer to the white arrows in FIG. 10), vibration caused by electrostriction can be absorbed by the flexibility of the plate-like legs 21 of both terminal strips 20 and therefore noise that may otherwise occur as a result of transmission of such vibration to the board SU can be suppressed.

As described in "Prior Art," using the reflow method to join the plate-like mounting parts 23 of both terminal strips 20 to the pads PA on the board SU via the solder SO may cause the solder 30 to melt during the reflow process, posing a risk of the capacitor 10 slipping from both terminal strips 20.

With the electronic component with terminal strips shown in FIGS. 1 to 4, on the other hand, the two plate-like supports 24 of each terminal strip 20 are formed by bending two plate-like parts inward, which two plate-like parts project outward in a line-symmetrical manner from both side edges of the plate-like leg 22 in the width direction before bending, in such a way that at least the tips 24a of the thickness surfaces on the capacitor 10 sides of the two plate-like parts are positioned below the external electrode 12 of the capacitor 10, and the capacitor 10 is supported from below by the tips 24a of the thickness surfaces on the capacitor 10 sides of the four plate-like supports 24.

In other words, the capacitor 10 can be supported reliably with the tips 24a of the four plate-like supports 24 without having to accurately control the bending angle of each plate-like support 24 and restoration of its shape after bending, which means that slipping of the capacitor 10 from both terminal strips 20 can be suppressed in a reliable manner even when the solder 30 melts during the reflow process.

For example, even when the bending angle of one of the four plate-like supports 24 is different from the bending angle of the other three, the capacitor 10 can be supported reliably by the tips 24a of the four plate-like supports 24 as long as at least the tip 24a of the thickness surface on the capacitor 10 side of this one plate-like support 24 is positioned below the external electrode 12 of the capacitor 10. In essence, even when the bending angle of at least one of the four plate-like supports 24 is different, the capacitor 10 will not tilt due to the different bending angles, and needless to say such tilting of the capacitor 10 will not cause the capacitor 10 to slip more as has traditionally been the case.

Also with the electronic component with terminal strips shown in FIGS. 1 to 4, the four plate-like supports 24 are such that the tips 24a of the thickness surfaces on the capacitor 10 sides are contacting the bottom surface of the external electrode 12 of the capacitor 10 in a state of surface contact, and furthermore a clearance CL exists between the thickness surface, except for the tip 24a, on the capacitor 10 side of each of the four plate-like supports 24 and the bottom surface of the external electrode 12 of the capacitor 10.

In other words, even when the solder 30 melts during the reflow process, the clearance CL prevents the molten solder 30 from reaching the tip 24a of each plate-like support 24 and consequently the tip 24a of each plate-like support 24 will not join the external electrode 12 by means of the solder 30 and the flexibility of each plate-like leg 22 will not be lost, which may otherwise result from such joining.

The aforementioned clearance CL is particularly useful when the terminal strip 20 is produced using the material plate MP1 shown in (A) in FIG. 7 or material plate MP2 shown in (B) in FIG. 7. In other words, when the material plate MP1 or MP2 is used, both auxiliary metal layers LY2, LY3, or one auxiliary metal layer LY2 are/is exposed on both sides of the main metal layer LY1, as shown in (A) in FIG. 9 and (B) in FIG. 9, on the thickness surface on the capacitor 10 side of each plate-like support 24. Due to its high solder 30 wettability, the auxiliary metal layers (LY2, LY3) allow the molten solder 30 to easily travel toward the tip 24a, but because the aforementioned clearance CL serves to suppress this traveling of solder and therefore the tip 24a of each plate-like joint 24 will not join the external electrode 12 by means of the solder 30.

<<Second Embodiment>>

An electronic component with terminal strips to which the present invention is applied (Second Embodiment) is explained below by citing FIG. 11.

Figure 11:
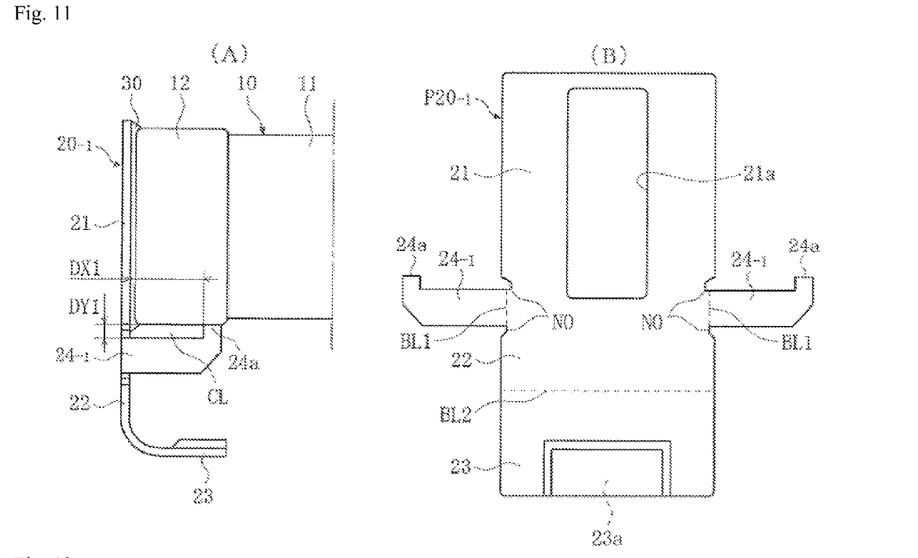

The electronic component with terminal strips shown in (A) in FIG. 11 is different from the electronic component with terminal strips shown in FIGS. 1 to 4 in that:

The projecting length (corresponding to the lateral dimension DX1 that determines the clearance CL) of the two plate-like parts of the plate-like base material P20-1 shown in (B) in FIG. 11, which will become the plate-like supports 24-1, is increased so as to move away from the plate-like joint 21 and plate-like leg 22 the position at which the tip 24a of the plate-like support 24-1 of each terminal strip 20-1 contacts the bottom surface of each external electrode 12 of the capacitor 10, as shown in FIG. 11 (A).

The same effects described above in the First Embodiment can also be achieved with the electronic component with terminal strips shown in (A) in FIG. 11.

<<Third Embodiment>>

An electronic component with terminal strips to which the present invention is applied (Third Embodiment) is explained below by citing FIG. 12.

Figure 12:
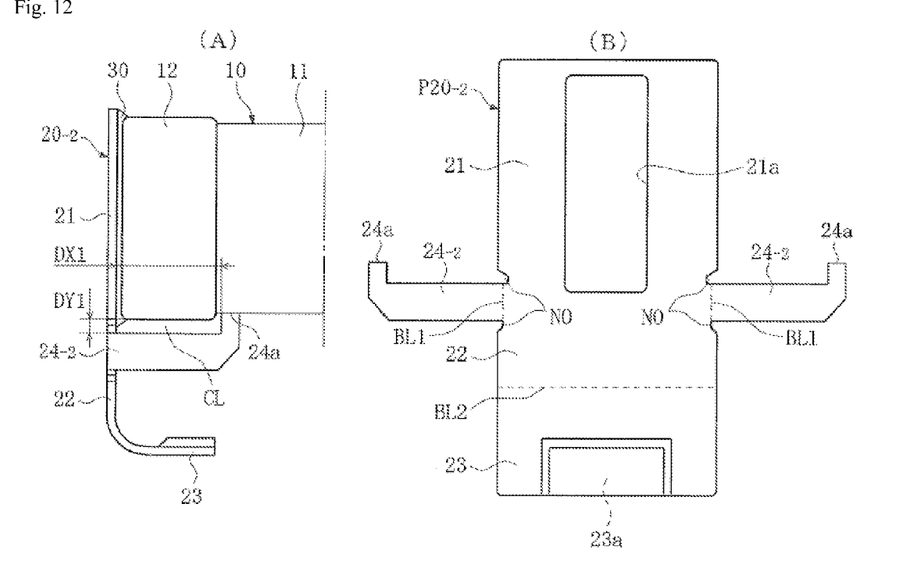

The electronic component with terminal strips shown in (A) in FIG. 12 is different from the electronic component with terminal strips shown in FIGS. 1 to 4 in that:

The projecting length (corresponding to the lateral dimension DX1 that determines the clearance CL) of the two plate-like parts of the plate-like base material P20-2 shown in (B) in FIG. 12, which will become the plate-like supports 24-2, is increased, while the height of the tip 24a of each plate-like part is also increased, so that the tip 24a of the plate-like support 24-2 of each terminal strip 20-2 contacts the bottom surface of the main body 11 of the capacitor 10 in a state of surface contact, as shown in (A) in FIG. 12.

The same effects described above in the First Embodiment can also be achieved with the electronic component with terminal strips shown in (A) in FIG. 12.

Also with the electronic component with terminal strips shown in (A) in FIG. 12, the tip 24a of each plate-like support 24-2 is contacting the bottom surface (non-metal) of the main body 11 of the capacitor 10 and therefore, even if the molten solder 30 reaches the tip 24a of each plate-like support 24-2 during the reflow process, each tip 24a will not join the main body 11 by means of the solder 30.

<<Fourth Embodiment>>

An electronic component with terminal strips to which the present invention is applied (Fourth Embodiment) is explained below by citing FIG. 13.

Figure 13:
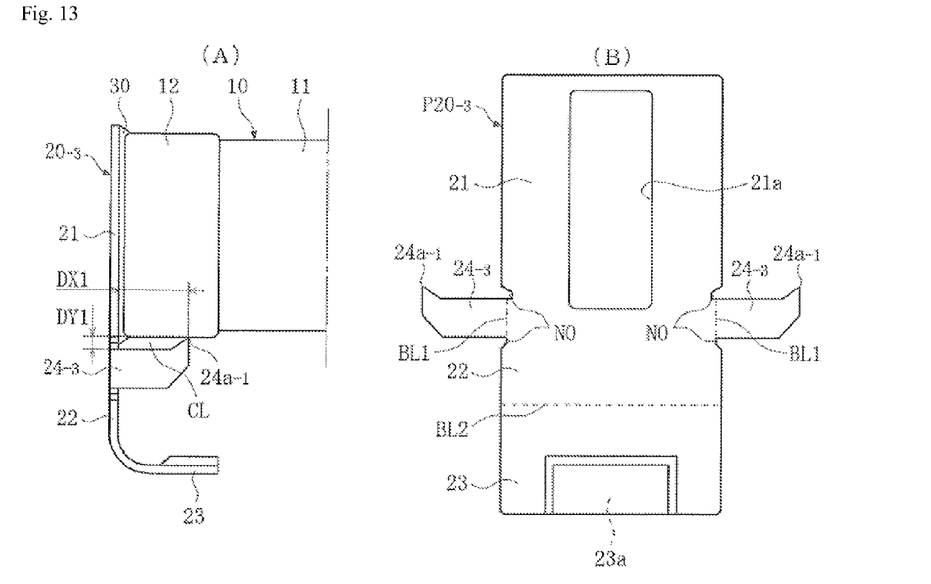

The electronic component with terminal strips shown in (A) in FIG. 13 is different from the electronic component with terminal strips shown in FIGS. 1 to 4 in that:

The tips 24a-1 of the two plate-like parts of the plate-like base material P20-3 shown in (B) in FIG. 13, which will become the plate-like supports 24-3, are tapered so that the tip 24a-1 of the plate-like support 24-3 of each terminal strip 20-3 contacts the bottom surface of each external electrode 12 of the capacitor 10 in a state of line contact (referring to either a state of complete line contact or incomplete line contact), as shown in (A) in FIG. 13.

The same effects described above in the First Embodiment can also be achieved with the electronic component with terminal strips shown in (A) in FIG. 13.

Also with the electronic component with terminal strips shown in (A) in FIG. 13, the frictional resistance at the tip 24a-1 of each plate-like support 24-3 contacting the bottom surface of each external electrode 12 of the capacitor 10 can be reduced, and therefore any loss of flexibility of each plate-like leg 22 that may otherwise occur due to such frictional resistance can be minimized.

<<Fifth Embodiment>>

An electronic component with terminal strips to which the present invention is applied (Fifth Embodiment) is explained below by citing FIG. 14.

Figure 14:
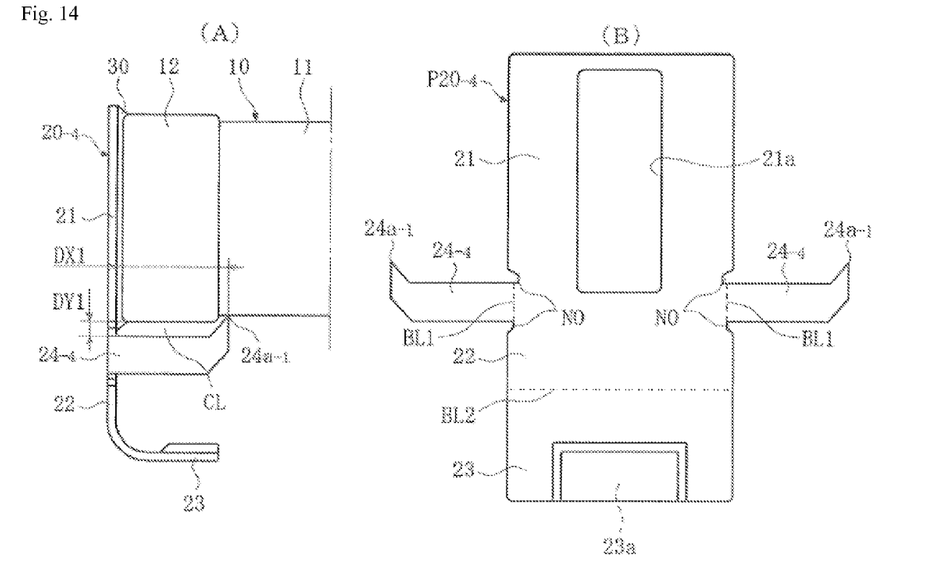

The electronic component with terminal strips shown in (A) in FIG. 14 is different from the electronic component with terminal strips shown in FIGS. 1 to 4 in that:

The projecting length (corresponding to the lateral dimension DX1 that determines the clearance CL) of the two plate-like parts of the plate-like base material P20-4 shown in (B) in FIG. 14, which will become the plate-like supports 24-4, is increased, while the tip 24a-1 of each plate-like part is tapered and its height increased, so that the tip 24a-1 of the plate-like support 24-4 of each terminal strip 20-4 contacts the bottom surface of the main body 11 of the capacitor 10 in a state of line contact, as shown in (A) in FIG. 14.

The same effects described above in the First Embodiment can also be achieved with the electronic component with terminal strips shown in (A) in FIG. 14.

Also with the electronic component with terminal strips shown in (A) in FIG. 14, the frictional resistance at the tip 24a-1 of each plate-like support 24-4 contacting the bottom surface of the main body 11 of the capacitor 10 can be reduced, and therefore any loss of flexibility of each plate-like leg 22 that may otherwise occur due to such frictional resistance can be minimized.

Also with the electronic component with terminal strips shown in (A) in FIG. 14, the tip 24a-1 of each plate-like support 24-4 is contacting the bottom surface (non-metal) of the main body 11 of the capacitor 10 and therefore, should the molten solder 30 reach the tip 24a-1 of each plate-like support 24-4 during the reflow process, each tip 24a-1 will not join the main body 11 by means of the solder 30.

<<Sixth Embodiment>>

An electronic component with terminal strips to which the present invention is applied (Sixth Embodiment) is explained below by citing FIG. 15.

Figure 15:
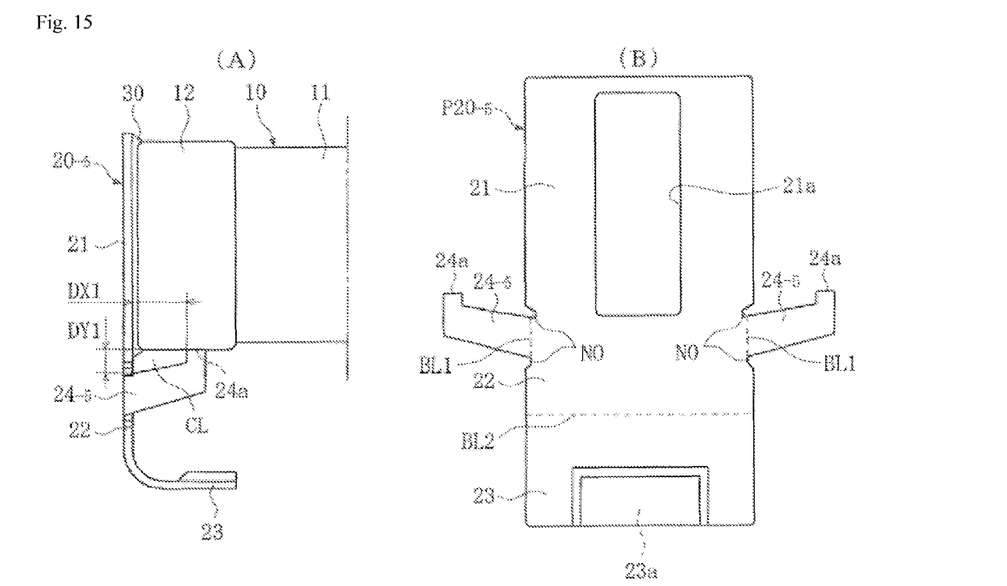

The electronic component with terminal strips shown in (A) in FIG. 15 is different from the electronic component with terminal strips shown in FIGS. 1 to 4 in that:

The two plate-like parts of the plate-like base material P20-5 shown in (B) in FIG. 15, which will become the plate-like supports 24-5, are provided as bands facing diagonally up, except for the tips, so that the tip 24a of the plate-like support 24-5 of each terminal strip 20-5 contacts the bottom surface of each external electrode 12 of the capacitor 10 in a state of surface contact, as shown in (A) in FIG. 15.

The same effects described above in the First Embodiment can also be achieved with the electronic component with terminal strips shown in (A) in FIG. 15.

Also with the electronic component with terminal strips shown in (A) in FIG. 15, the vertical dimension DY1 that defines the clearance CL can be increased to expand the clearance CL and therefore, if the solder 30 melts during the reflow process, the clearance CL can reliably prevent the molten solder 30 from reaching the tip 24a of each plate-like support 24.

Incidentally, with the electronic component with terminal strips shown in (A) in FIG. 15, the projecting length (corresponding to the lateral dimension DX1 that determines the clearance CL) of the two plate-like parts of the plate-like base material P20-5, which will become the plate-like supports 24-5, can be increased, and the height of the tip 24a of each plate-like part can also be increased, so that the tip 24a of each plate-like support 24-5 contacts the bottom surface of the main body 11 of the capacitor 10 in a state of surface contact, in order to achieve the same effect described in the last part of the Third Embodiment above.

<<Seventh Embodiment>>

An electronic component with terminal strips to which the present invention is applied (Seventh Embodiment) is explained below by citing FIG. 16.

Figure 16:
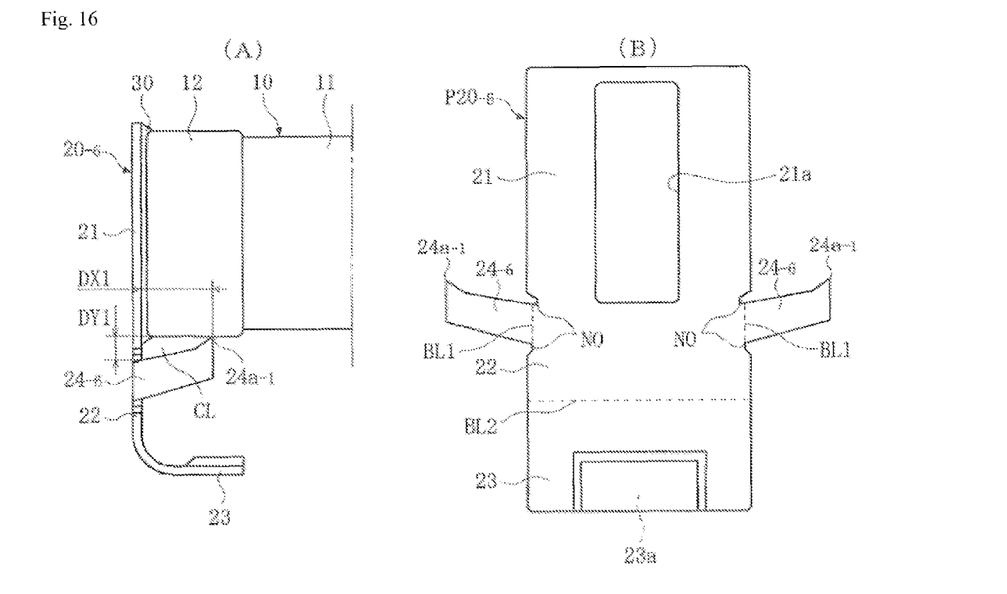

The electronic component with terminal strips shown in (A) in FIG. 16 is different from the electronic component with terminal strips shown in FIGS. 1 to 4 in that:

The two plate-like parts of the plate-like base material P20-6 shown in (B) in FIG. 16, which will become the plate-like supports 24-6, are provided as bands facing diagonally up, except for the tips, while the tip 24a-1 of each plate-like part is tapered, so that the tip 24a-1 of the plate-like support 24-6 of each terminal strip 20-6 contacts the bottom surface of each external electrode 12 of the capacitor 10 in a state of line contact, as shown in (A) in FIG. 16.

The same effects described above in the First Embodiment can also be achieved with the electronic component with terminal strips shown in (A) in FIG. 16.

Also with the electronic component with terminal strips shown in (A) in FIG. 16, the frictional resistance at the tip 24a-1 of each plate-like support 24-6 contacting the bottom surface of each external electrode 12 of the capacitor 10 can be reduced, and therefore any loss of flexibility of each plate-like leg 22 that may otherwise occur due to such frictional resistance can be minimized.

Further with the electronic component with terminal strips shown in (A) in FIG. 16, the vertical dimension DY1 that defines the clearance CL can be increased to expand the clearance CL and therefore, if the solder 30 melts during the reflow process, the clearance CL can reliably prevent the molten solder 30 from reaching the tip 24a-1 of each plate-like support 24.

Incidentally, with the electronic component with terminal strips shown in (A) in FIG. 16, the projecting length (corresponding to the lateral dimension DX1 that determines the clearance CL) of the two plate-like parts of the plate-like base material P20-6, which will become the plate-like supports 24-6, can be increased, and the height of the tip 24a-1 of each plate-like part can also be increased, so that the tip 24a-1 of each plate-like support 24-6 contacts the bottom surface of the main body 11 of the capacitor 10 in a state of line contact, in order to achieve the same effect described in the last part of the Fifth Embodiment above.

<<Eighth Embodiment>>

An electronic component with terminal strips to which the present invention is applied (Eighth Embodiment) is explained below by citing FIG. 17.

Figure 17:
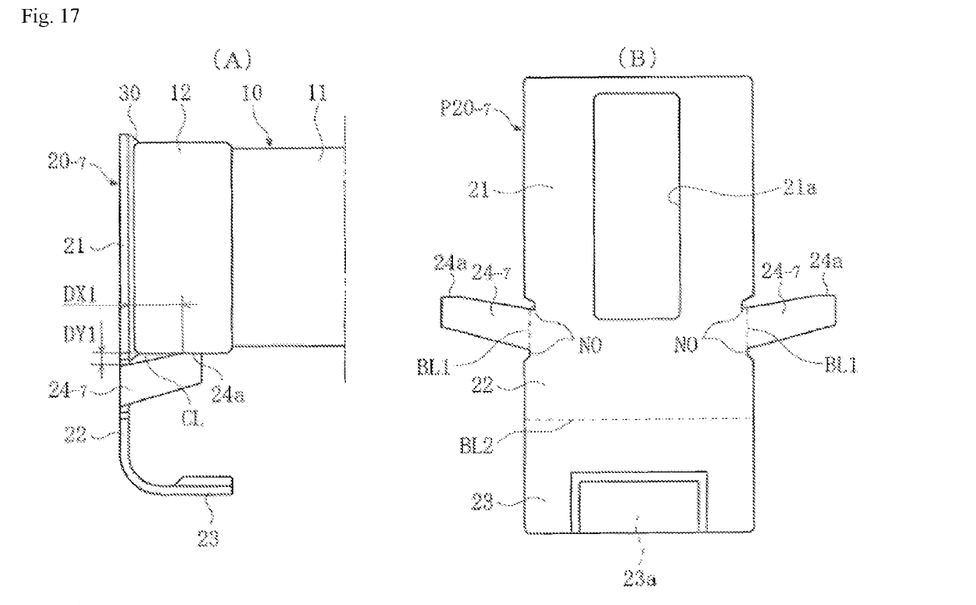

The electronic component with terminal strips shown in (A) in FIG. 17 is different from the electronic component with terminal strips shown in FIGS. 1 to 4 in that:

The two plate-like parts of the plate-like base material P20-7 shown in FIG. 17 (B), which will become the plate-like supports 24-7, are provided as bands facing diagonally up, except for the tips, while the height of the tip 24a of each plate-like part is reduced, so that the tip 24a of the plate-like support 24-7 of each terminal strip 20-7 contacts the bottom surface of each external electrode 12 of the capacitor 10 in a state of surface contact, as shown in (A) in FIG. 17.

The same effects described above in the First Embodiment can also be achieved with the electronic component with terminal strips shown in (A) in FIG. 17.

Incidentally, with the electronic component with terminal strips shown in (A) in FIG. 17, the projecting length (corresponding to the lateral dimension DX1 that determines the clearance CL) of the two plate-like parts of the plate-like base material P20-7, which will become the plate-like supports 24-7, can be increased, and the tilting angle of each plate-like part except for the tip 24a can also be increased, so that the tip 24a of each plate-like support 24-7 contacts the bottom surface of the main body 11 of the capacitor 10 in a state of surface contact, in order to achieve the same effect described in the last part of the Third Embodiment above as well as the same effect described in the last part of the Sixth Embodiment above.

<<Ninth Embodiment>>

An electronic component with terminal strips to which the present invention is applied (Ninth Embodiment) is explained below by citing FIG. 18.

Figure 18:
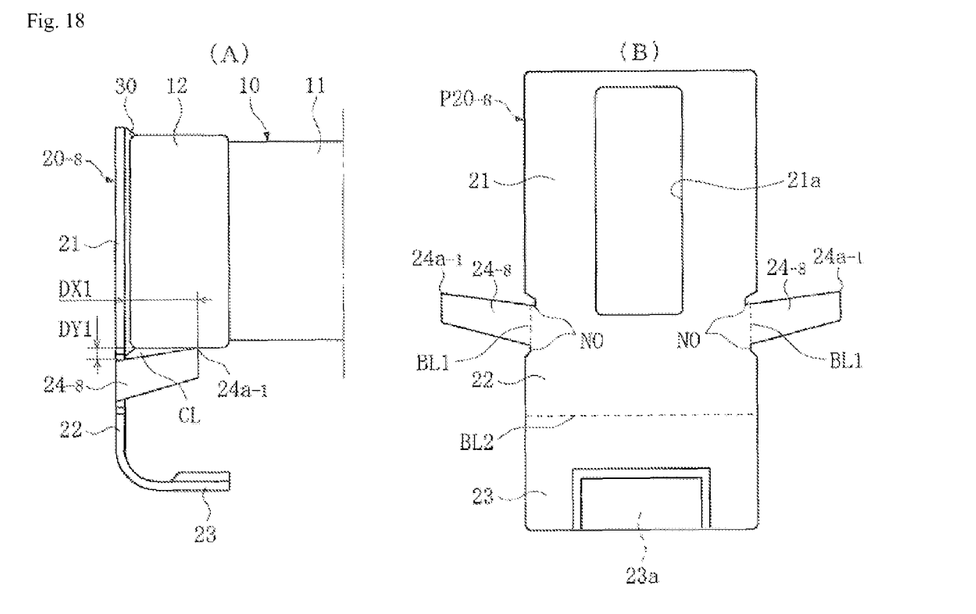

The electronic component with terminal strips shown in (A) in FIG. 18 is different from the electronic component with terminal strips shown in FIGS. 1 to 4 in that:

The two plate-like parts of the plate-like base material P20-8 shown in (B) in FIG. 18, which will become the plate-like supports 24-8, are provided as bands facing diagonally up, except for the tips, while the tip 24a-1 of each plate-like part is tapered and its height decreased, so that the tip 24a-1 of the plate-like support 24-8 of each terminal strip 20-8 contacts the bottom surface of each external electrode 12 of the capacitor 10 in a state of line contact, as shown in (A) in FIG. 18.

The same effects described above in the First Embodiment can also be achieved with the electronic component with terminal strips shown in (A) in FIG. 18.

Also, with the electronic component with terminal strips shown in (A) in FIG. 18, the frictional resistance at the tip 24a-1 of each plate-like support 24-8 contacting the bottom surface of each external electrode 12 of the capacitor 10 can be reduced, and therefore any loss of flexibility of each plate-like leg 22 that may otherwise occur due to such frictional resistance can be minimized.

Incidentally, with the electronic component with terminal strips shown in (A) in FIG. 18, the projecting length (corresponding to the lateral dimension DX1 that determines the clearance CL) of the two plate-like parts of the plate-like base material P20-8, which will become the plate-like supports 24-8, can be increased, and the tilting angle of each plate-like part except for the tip can also be increased, so that the tip 24a-1 of each plate-like support 24-8 contacts the bottom surface of the main body 11 of the capacitor 10 in a state of line contact, in order to achieve the same effect described in the last part of the Fifth Embodiment above as well as the same effect described in the last part of the Seventh Embodiment above.

<<Other Embodiments>>

(1) Examples where the electronic component is a capacitor 10, or specifically a capacitor with terminal strips, were shown in the First Embodiment through Ninth Embodiment above, but the same effects described above can also be achieved when the capacitor 10 is changed to a different type of electronic component.

(2) Examples where each terminal strip 20, 20-1, 20-2, 20-3, 20-4, 20-5, 20-6, 20-7, or 20-8 has a notch NO and concave 23a were shown in the First Embodiment through Ninth Embodiment above, but the same effects described above can also be achieved when the notch NO is eliminated, and the same effects described above can also be achieved when the concave 23a is eliminated and each plate-like mounting part 23 is flattened.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priorities to Japanese Patent Applications No. 2012-190106, filed Aug. 30, 2012, and No. 2013-151646, filed Jul. 22, 2013, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electronic component with terminal strips, which comprises an electronic component having external electrodes on its opposing ends, as well as a terminal strip joined to each of the external electrodes, and which is configured to mount the electronic component onto a board or other mating part by both terminal strips, wherein:

each of the terminal strips has a plate-like joint being joined via a solder to an end face of each of the external electrodes, a plate-like leg continuing from the plate-like joint, a plate-like mounting part continuing from the plate-like leg, and two plate-like supports continuing from the plate-like leg;

the two plate-like supports are formed by bending inwardly, as viewed from above, two plate-like parts projecting in a line-symmetrical manner with reference to a direction perpendicular to an axis of the electronic component, from both side edges of the plate-like leg as viewed in a direction of the axis of the electronic component, such that at least a tip of a thickness surface on the electronic component side of each plate-like part is positioned below the electronic component and in contact with a bottom face of the corresponding external electrode; and the electronic component is supported from below by at least the tips of the thickness surfaces on the electronic component sides of the four plate-like supports.

2. An electronic component with terminal which comprises an electronic component having external electrodes on its opposing ends, as well as a terminal strip joined to each of the external electrodes, and which is configured to mount the electronic component onto a board or other mating part by both terminal strips, wherein:

each of the terminal strips has a plate-like joint being joined via a solder to an end face of each of the external electrodes, a plate-like leg continuing from the plate-like joint, a plate-like mounting part continuing from the plate-like leg, and two plate-like supports continuing from the plate-like leg;

the two plate-like supports are formed by bending inwardly two plate-like parts projecting in a line-symmetrical manner from both side edges of the plate-like leg such that at least a tip of a thickness surface on the electronic component side of each plate-like part is positioned below the electronic component; and the electronic component is supported from below by at least the tips of the thickness surfaces on the electronic component sides of the four plate-like supports, wherein the four plate-like supports are such that the tips of the thickness surfaces on their electronic component sides are contacting a bottom surface of the electronic component in a state of surface contact or line contact.

3. An electronic component with terminal strips according to claim 2, wherein a clearance exists between the thickness surface, except for the tip, on the electronic component side of each of the four plate-like supports and the bottom surface of the electronic component.

4. An electronic component with terminal strips according to claim 3, wherein the bottom surface of the electronic component contacted by each of the tips represents a bottom surface of the external electrode of the electronic component.

5. An electronic component with terminal strips according to claim 3, wherein the bottom surface of the electronic component contacted by each of the tips represents the bottom surface of the electronic component except for the external electrode.

6. An electronic component with terminal strips according to claim 2, wherein the bottom surface of the electronic component contacted by each of the tips represents a bottom surface of the external electrode of the electronic component.

7. An electronic component with terminal strips according to claim 2, wherein the bottom surface of the electronic component contacted by each of the tips represents the bottom surface of the electronic component except for the external electrode.

* * * * *